INVENTORS
FRANK HATHORN TOWLER
JOHN MAURICE TOWLER
BY:
ATTORNEYS

United States Patent Office 2,891,517
Patented June 23, 1959

2,891,517

HYDRAULIC PRESS CONTROL SYSTEMS AND PILOT OPERATED DIRECTIONAL CONTROL VALVE THEREFOR

John Maurice Towler, deceased, late of Mayfair, London, England, by Frank Hathorn Towler, executor, Dob Park, Otley, England, and Frank Hathorn Towler, Dob Park, Otley, England, assignors to Electraulic Presses Limited, Rodley near Leeds, England, a limited-liability company of Great Britain Continuation of abandoned application Serial No. 325,288, December 11, 1952. This application April 10, 1956, Serial No. 577,416

Claims priority, application Great Britain December 11, 1951

10 Claims. (Cl. 121—46.5)

The invention relates to the control of hydraulic presses and comparable apparatus having cylinder and piston actuators operated by pressure fluid from a primary source of high pressure fluid and it is more particularly concerned with an improved control system for such apparatus in which the high pressure fluid supply is distributed and controlled by valves, some of which are operated by pressure fluid from a secondary or pilot pressure fluid source at substantially lower pressure than the primary pressure fluid. This application is a continuation of our earlier filed application, Serial No. 325,288, filed December 11, 1952, now abandoned.

One object of the invention is to provide in a control system of the above general character improved valve means for controlling both the primary pressure fluid supply and the pilot pressure fluid supply.

Another object is to provide an improved pilot operated directional control valve operative to control both the main hydraulic actuator or ram of a press or the like and subsidiary hydraulic apparatus constituting a part of the control system.

A more specific object is to provide a control system in which provision is made for automatically loading the pump supplying primary pressure fluid upon movement of a direction control valve from neutral position to either of two operated positions.

A further object is to provide a directional control valve for high pressure systems embodying automatically operating means for restricting exhaust of fluid through the valve until the pressure of the fluid has fallen to a predetermined safe level.

Other objects and advantages of the invention will become apparent from the following detailed description of the preferred embodiment illustrated in the accompanying drawings in which.

While a preferred form of the control valve embodying the invention and its incorporation in a preferred form of hydraulic press control system have been shown by way of illustration and will be described in detail herein, this is not intended to limit the invention to the particular form of valve or the particular application shown. On the contrary, the intention is to cover all modifications and adaptations falling within the spirit and scope of the invention as expressed in the appended claims.

Figure 5:
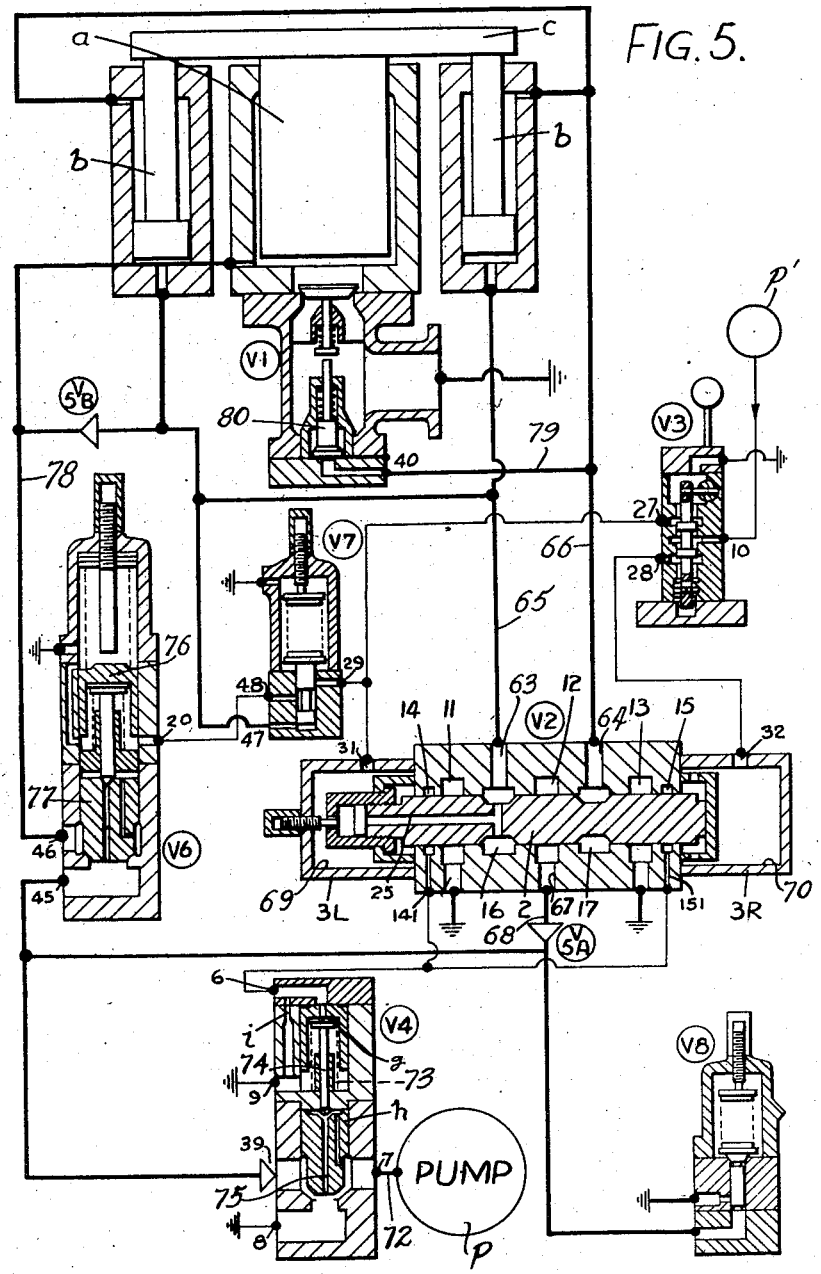
Fig. 5 is a circuit diagram of a hydraulic press equipped with a control system utilizing the improved valve shown in Fig. 1.

Referring to Fig. 5 of the drawings, the invention has been shown as incorporated in the control system of a simple, upstroking hydraulic press having a main hydraulic ram $a$ and a pair of double acting actuators or return rams $b$ for raising and lowering a press table $c$. The operational or pressing stroke is the upstroke in this particular press. The press shown is equipped with a conventional prefill and exhaust valve V1 which opens to allow fluid such as oil from a supply tank (not shown) to flow into the main ram cylinder when the press table is raised in a fast approach by the rams $b$. During the pressing portion of the press stroke, valve V1 remains closed and fluid under high pressure is supplied to the main ram cylinder directly from a source of primary pressure fluid such as a high pressure pump P.

The control system for the press as herein shown comprises, in addition to the prefill valve V1 above mentioned, a direction control valve V2 adapted to be operated by pilot pressure fluid under control of a pressure operated pilot control valve V3. The control system also includes what is known as an amplifier unloading valve V4 for loading and unloading the pump P, nonreturn valves V5A and V5B for restricting fluid flow in the system, an amplifier admission valve V6 controlling the direct supply of fluid from the pump to the main ram, a pressure operated admission valve V7 controlling the amplifier admission valve and a relief valve V8 which guards against excessive pressure in the system. These valves, with the exception of valve V2 described in detail hereinafter, are of well known construction and their mode of operation in the instant control system will be fully explained in connection with the operation of the press.

Figure 1:
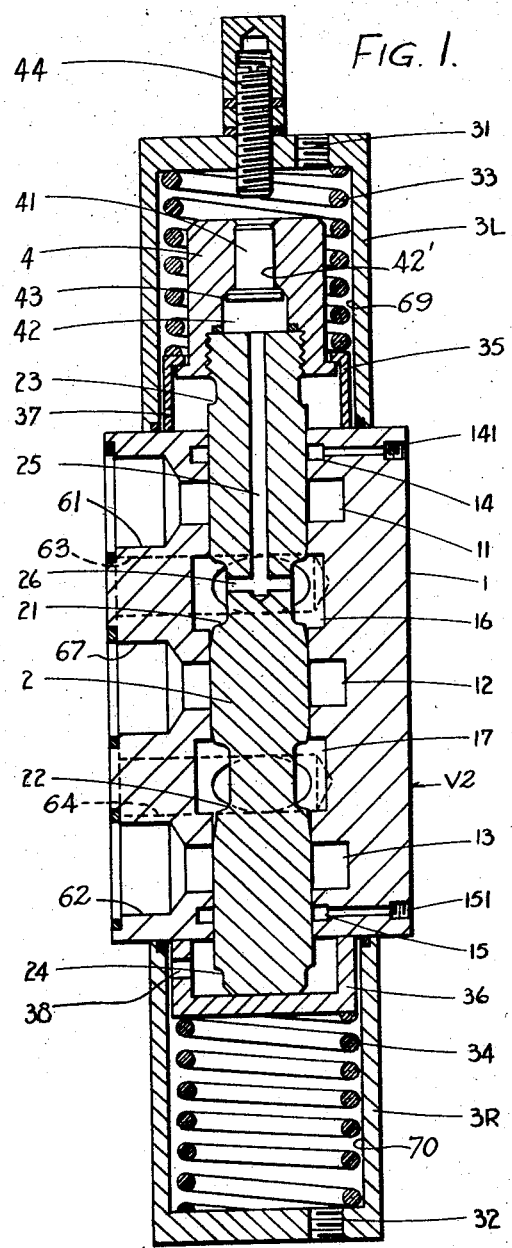
Figure 1 is a longitudinal sectional view of a pilot pressure operated directional control valve embodying the features of the invention.
Figures 2, 3, 4:
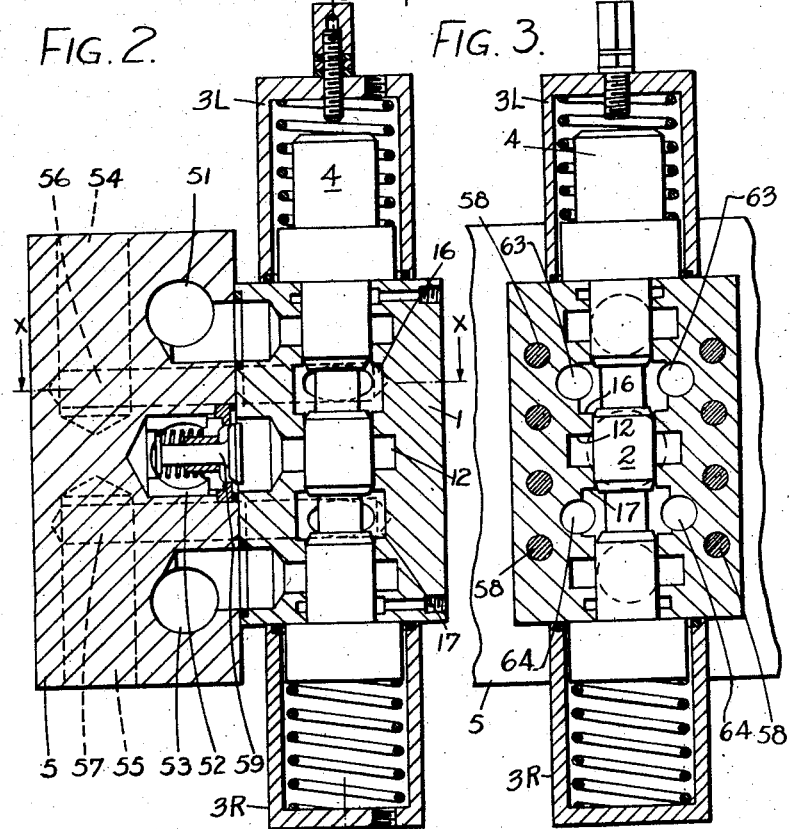
Fig. 2 is a longitudinal sectional view of the valve showing its mounting on a manifold.
Fig. 3 is a longitudinal sectional view of the valve taken in a plane substantially on the line Y—Y of Fig. 2.
Fig. 4 is a transverse sectional view of the valve taken in a plane substantially on the line X—X of Fig. 2.

Turning now to the construction of the direction control valve V2 and referring to Figs. 1–3 of the drawings, it will be observed that the valve comprises a body 1 with a central bore in which a spindle 2 has a sliding lap fit. Spaced apart axially of the bore are a series of annular chambers 11, 12, 13, 14, 15, 16 and 17. These chambers all open through ports in the valve body for connection with elements of the control system or press. Thus, chambers 11 and 13 open through ports 61 and 62 which in the system shown are connected to exhaust. Chambers 16 and 17 open through ports 63 and 64 which are respectively connected to opposite ends of the return ram cylinders $b$ by conduits 65 and 66. Chamber 12 opens through a pressure inlet port 67 connected to a fluid supply line 68 receiving primary pressure fluid from the pump P. Chambers 14 and 15 open respectively through ports 141 and 151, in this instance connected in multiple to an inlet port 6 of the unloading valve V4.

In the exemplary valve, the spindle 2 is formed with reduced portions 21 and 22 disposed so that upon movement of the spindle downwardly as viewed in Fig. 1, or to the extreme right as viewed in Fig. 5, chamber 12 will be placed in communication with chamber 16 and consequently pressure fluid received from the conduit 68 will be directed via the conduit 65 to the lower ends of the ram cylinders $b$. In that position of the spindle, chamber 13 will also be placed in communication with chamber 17 so that the upper ends of the ram cylinders will be connected to exhaust via the conduit 66. Conversely, when the spindle 2 is moved in the opposite direction to its other extreme position, the connections to the ram cylinders will be reversed.

As shown in Fig. 1, the valve spindle 2 is dimensioned lengthwise so that opposite ends project beyond the ends of the valve body 1 and into casings 3L and 3R secured to the valve body and defining hermetically sealed operating cylinders 69 and 70 for the spindle. These cylinder casings are respectively provided with inlet ports 31 and 32 adapted to be connected selectively to a source of pilot pressure fluid and to exhaust for shifting the spindle to either extreme position. The spindle is normally urged to and retained in a central or neutral position by springs 33 and 34 interposed between the ends of the casings 3L and 3R and spring pads 35 and 36 coacting with opposite ends of the spindle. The pads are constructed and arranged so that they will engage the end of the valve body and prevent movement of the spindle beyond the central position by the springs. These pads are maintained in hydraulic balance by the provision of holes 37 and 38 therein to afford free access of pressure fluid to both sides of the pads.

In accordance with one aspect of the invention, valve V2 embodies novel features of construction which enable it to control auxiliary pilot pressure operated apparatus in addition to controlling the primary pressure fluid supply to a main actuator or actuators such as the return rams 6. For this purpose, the spindle is formed with reduced portions 23 and 24 located so as to establish communication between the operating cylinders 69 and 70 and valve chambers 14 and 15 when the spindle 2 is shifted to one or the other of its operated positions. As explained before, chambers 14 and 15 are connected with the auxiliary apparatus to be controlled, in this instance, the pump unloading valve V4.

In the particular valve shown, the reduced spindle portion 23 is located and dimensioned so as to span the land between chambers 14 and the cylinder 69 when the spindle 62 is moved to its extreme right position as viewed in Fig. 5. Reduced spindle portion 24 is similarly located and dimensioned so as to span the land between the chamber 15 and the cylinder 70 when the spindle is moved to its other extreme position.

It will be evident that when connected in the control system as above explained, valve V2 when operated to direct pressure fluid to the ram cylinders $b$ will simultaneously direct pilot pressure fluid to the pump unloading valve V4. This valve is connected in the fluid discharge line 72 of the pump P and is constructed and arranged so that its plunger $h$ is normally held in the open position so as to divert the fluid from the pump through a port 8 to exhaust. Pilot pressure fluid directed through the port 6 acts on the upper end of a piston $g$ to push it down against the load imposed by a spring 73. Piston $g$, in turn, pushes the valve plunger $h$ against its seat, thereby interrupting the exhaust of fluid through the port 8 so that full pump pressure may be delivered through a supply port 39 to the press operating rams.

Upon interruption of the pilot pressure supply in the port 6, the spring 73 lifts the piston $g$ displacing the fluid in the piston chamber through a small orifice $i$ situated near the pilot inlet port 6 and in communication with an exhaust port 9. Raising of the piston $g$ relieves the pressure exerted on the upper end of the plunger $h$ through valve stem 74. Pressure on the plunger thus becomes unbalanced due to the leakage of fluid from the top of the plunger chamber to exhaust by way of a central passage 75 provided in the plunger. Pump pressure acting on the lower end of the plunger forces it upwardly and again unloads the pump by diverting the pump discharge to exhaust.

In accordance with another aspect of the invention the valve V2 is constructed and arranged to prevent dangerous surges of fluid when the valve is used for controlling the exhaust of fluid from actuator cylinders or the like in which the fluid is confined at very high pressure. More particularly, the valve is provided with a decompression device which acts automatically to limit movement of the valve spindle 2 to a position in which the high pressure fluid is bled off gradually or "wiredrawn" until the pressure of the fluid decreases to a predetermined safe value. When the pressure of the fluid is suitably lowered, the valve spindle is permitted to move to fully open position to provide for rapid exhaust of the fluid.

While decompression devices may be provided for controlling spindle movement in both directions if desired, usually decompression control is required in only one position of the valve and accordingly the exemplary valve has been shown equipped with a single decompression device. Thus, as shown in Fig. 1 of the drawings, the upper end of the spindle 2 is fitted with a decompression device including a cylindrical member 4 screw threaded to the end of the spindle. The member 4 is formed with a stepped bore defining a decompression chamber 42 adjacent the end of the spindle. This decompression chamber opens through the upper end of the member 4 by way of a cylinder 42′ slidably accommodating a decompression plunger 41. Upward movement of the plunger in the cylinder 42′ is limited by an enlarged head 43 disposed within the chamber 42. When advanced to its limit position by pressure fluid in the decompression chamber, the plunger 41 is adapted to cooperate with an adjustable stop screw 44 threaded through the end wall of a casing 32 and provided with suitable means for locking it in a predetermined set position.

As will be seen by reference to Fig. 1, the decompression chamber 42 is in constant communication with valve chamber 16 by way of a central bore 25 in the valve spindle having radial ports 26 opening into the reduced portion 21 of the valve. Consequently, the decompression plunger 41 is subject to the full pressure of the fluid in the cylinder or other device connected to the chamber and the plunger is therefore held in its outermost position with the head 43 abutting the end of the decompression chamber 42. To provide the decompression action, the stop screw 44 is set for engagement by the plunger 41 in the shifting of the valve spindle just as the reduced portion 21 of the spindle begins to enter the chamber 11. As long as high pressure is present in the chamber 16, the pressure exerted on the plunger 41 will effectively limit further movement of the valve spindle by pilot pressure fluid and thus restrict the exhaust opening between the chamber 16 and chamber 11. That is to say, the valve spindle is movable to a position to permit only very limited exhaust of fluid from the chamber 16 until such time as the pressure in the chamber and the apparatus to which it is connected drops to a predetermined value. Upon such pressure drop, the pilot pressure acting on the spindle shifts it to the full operated position displacing plunger 41 inwardly against the force exerted on it by the exhaust fluid. It will be apparent that the rate of exhaust through the valve in the decompression position can be varied by adjusting the position of the stop screw 44.

If decompression is required in the other extreme position of the valve spindle 1, this can be provided by equipping the lower end of the spindle with a decompression device similar to that above described. It will be understood, of course, that under such conditions the spindle will be provided with a central bore and radial bores connecting the chamber 17 with the decompression chamber of the device and that a stop screw similar to the screw 45 will be provided on the casing 3R.

Means is provided for mounting the directional control valve V2 in a manner which enables it to be connected in the system with a minimum of piping and which affords accommodations for a plurality of such valves, if required. To this end, the valve body 1 is mounted on a manifold 5 formed with a longitudinal central bore 52 adapted to be connected to the source of primary pressure fluid. Respectively located at opposite sides of the bore 52 are two longitudinal bores 51 and 53 connected to exhaust. Suitable upwardly opening passages are provided in the manifold for registration with the ports 61, 62 and 67 in the valve body.

Manifold 5 is constructed to provide individual fluid passages for connection with ports 63 and 64 communicating with the chambers 16 and 17. Thus, as shown in Figs. 2 and 4, the chamber 16 communicates with a passage 54 in the manifold by way of a pair of transverse bores 56, which register with complemental twin ports 63 in the valve body. Similarly, chamber 17 communicates with a passage 55 in the manifold by way of transverse bores 57 registering with the twin ports 64.

The valve body 1 may be secured to the manifold 5 in any suitable way as by bolts 58, eight of such bolts being shown in the present instance. To insure a tight seal between the valve body and the manifold, suitable sealing rings may be provided around each of the ports. It will be evident that this manifolding arrangement makes possible the use of a very short and compact valve body and at the same time provides passages of ample area for the flow of pressure fluid to and from the valve. If more than one control valve is mounted on the manifold, a check valve 59 (Fig. 2) is provided in the lateral passage from the bore 52 to prevent reverse flow of fluid through the passage.

Having in mind the construction and interconnection of the press and valve elements above described, the operation of the press control system will be readily apparent. Referring to Fig. 5 the valves are shown in the positions which they occupy when the press is idle. Primary pump P, if running, is unloaded, that is, the fluid pressurized by the pump is discharged by way of the conduit 72 and valve V4 to exhaust via port 8. With valve V3 in the neutral position shown, pilot pressure is shut off from the entire system.

To initiate an operating cycle of the press, the handle of the valve V3 is swung clockwise, shifting the spindle of the valve to open communication between inlet port 10 and outlet port 27, outlet port 28 being connected to exhaust. Pilot pressure fluid is now directed by way of port 27 to port 31 of directional control valve V2 and thus into the operating cylinder 69 of that value. Spindle 2 of valve V2 is accordingly shifted to the right, as viewed in Fig. 5, establishing communication between chambers 12 and 16 and also between chambers 13 and 17. Just before the full stroke of the valve is completed, communication with port 141 will be opened to the operating cylinder 69 so that pilot pressure fluid will be directed into inlet port 6 of valve V4. This pressure fluid closes the unloading valve V4, interrupting the bypassing of the pump which now supplies fluid under pressure by way of chambers 12 and 16 and conduit 65 to the lower ends of the return ram cylinders b.

The return rams shift the press table c upwardly carrying with it the ram a. The cylinder of the ram a is filled from the supply tank by way of the prefill valve V1 which opens as before explained. During such upward movement, valve V6 remains closed, interrupting communication between ports 45 and 46 and thus shutting off the primary pressure source from the press ram. Valve V7 also remains closed, interrupting communication between ports 29 and 48, thus preventing delivery of pilot pressure fluid to the valve V6.

When the work is engaged incident to the raising of the press table, pressure builds up in the approach cylinders which, it will be observed, are connected to the port 47 of the valve V7. When the pressure reaches a predetermined value, the spindle of the valve V7 is raised to establish communication between ports 29 and 48, thereby directing pilot pressure fluid to port 20 of the valve V6. This pilot pressure fluid lifts the upper piston 76 of the valve V6, thus allowing the main valve element 77 to move upwardly under the urging of pressure fluid admitted through the port 45. Communication is thus established between ports 45 and 46 directing the fluid from the pump P directly to the main ram cylinder a by way of conduit connection 78.

Upon the completion of the pressing operation, the handle of the valve V3 is swung back to the return position connecting port 28 to port 10 and port 27 to exhaust. Pilot pressure fluid is now supplied to the port 32 of operating cylinder 70 of the valve V2 while the companion cylinder 69 is connected to exhaust. The spindle 2 of valve V2 is thus shifted toward its alternate position until the decompression piston 41 engages the stop screw 44. The valve spindle moves only to a position to establish a small discharge outlet from the chamber 16 so that the pressure fluid stored in the main ram a and in the approach rams b can be released slowly without shock. Pressure fluid from the main ram a is enabled to reach the valve by way of the one-way connection provided through the nonreturn valve 5VB.

When pressure in the ram cylinders has fallen to a predetermined value, as, for example, approximately 300 p.s.i., pilot pressure fluid introduced through pilot inlet port 32 to the operating cylinder 70 overcomes the resistance offered by the decompression plunger 41 and shifts the valve spindle 2 to fully operated position. This opens the exhaust fully so that the fluid may be quickly discharged from the ram cylinders.

Upon movement of the valve spindle toward the exhaust position and while still blocked by the decompression plunger as above explained, pilot fluid supply to port 6 of the unloading valve V4 is interrupted, thereby allowing that valve to open and unload the pump P. As the valve spindle 2 completes its operating stroke, pilot port 151 will be opened to pilot fluid supply in the operating cylinder 70, thus again closing valve V4 to load the pump. Pump delivery will then proceed by way of ports 7 and 39 of valve V4, chambers 12 and 17 of valve V2 and conduit 66 to the upper or return sides of the rams b. The press will now make its return stroke under power. Pressure fluid from the conduit 66 also passes through a branch conduit 79 to a port 40 of the valve V1 to act on a plunger 80 which serves to open the prefilled valve and allow the hydraulic fluid in the main press cylinder to return freely to the supply tank.

It will be appreciated that although the control system and valving herein shown and described is particularly well suited for an upstroking press, it is readily applicable to horizontal presses or downstroking presses where the tables are pumped down using approach rams. The term "pilot pressure" used throughout this specification refers to a fluid supply substantially independent of the main or primary pressure fluid supply. It may be provided by a separate source of supply, such as a pump P', or it may be derived from the primary pressure supply by way of a pressure reducing valve. In any case, the pilot pressure is substantially lower than primary pressure and can be handled by relatively light piping or tubing which materially simplifies manufacture and maintenance of the control system.

We claim as our invention:

1. In a hydraulic system, in combination, a double acting ram, a source of primary pressure fluid, an unloading valve normally operative to bypass said primary fluid source to exhaust, a source of pilot pressure fluid, a direction control valve having a body formed with a longitudinal bore, said body having a series of ports opening from said bore including an inlet port connected to said primary pressure fluid source, a pair of exhaust ports, a pair of primary outlet ports respectively connected to opposite ends of said ram and a pair of pilot outlet ports connected to said unloading valve, cylinders mounted at opposite ends of said valve body and opening to said bore, each of said cylinders having a port adapted to be connected to said source of pilot pressure fluid, a spindle slidably received in said bore and movable from a central neutral position in opposite directions to either of two operative positions, said spindle being dimensioned to present its opposite ends in respective ones of said cylinders, said spindle being operative when in the neutral position to block all of said ports and having reduced portions effective upon movement of the spindle to one operated position to connect said primary outlet ports respectively to said inlet port and one of said exhaust ports and to reverse such connections upon movement of the spindle to the other operated position, and said spindle having other reduced portions effective in one operated position of the spindle to establish communication between one of said cylinders and one of said pilot outlet ports and in the other of operated position to establish communication between the other of said cylinders and the other pilot outlet port and thereby direct pilot pressure fluid to said unloading valve to close the same and interrupt the bypassing of said primary fluid source.

2. In a hydraulic system having a double acting ram, a source of primary pressure fluid, a source of pilot pressure fluid, a pilot pressure operated direction valve, a pilot pressure operated unloading valve normally operative to by-pass said primary fluid source to exhaust, said direction valve comprising a body having an inlet port connected to the primary fluid source, a pair of exhaust ports, a pair of main outlet ports connected to said ram and a pair of pilot outlet ports connected to said unloading valve, cylinders at opposite ends of said valve body, a spindle slidable in said valve body into and out of said cylinders, said cylinders having ports for admitting pressure fluid from said pilot pressure source for shifting the spindle, said spindle having reduced portions operative in one shifted position to connect said main outlet ports respectively with said inlet port and one of said exhaust ports and operative in another shifted position to reverse the connections between those ports, and said spindle having other reduced portions operative in one shifted position of the spindle to establish communication between one of said cylinders and one of said pilot outlet ports and in the other shifted position of the spindle to establish communication between the other of said cylinders and the other pilot outlet port whereby to direct pilot pressure fluid to said unloading valve to close the same.

3. In a hydraulic system, in combination, a hydraulic ram, a source of primary pressure fluid, an unloading valve normally operative to by-pass said fluid source to exhaust, a source of pilot pressure fluid, a directional control valve for said ram comprising a valve body having a series of ports including an inlet port connected to said primary fluid source, a pair of exhaust ports, a pair of primary outlet ports connected to said ram and a pair of pilot outlet ports connected to said unloading valve, cylinders at opposite ends of said valve body, a spindle slidable through said valve body into and out of said cylinders, said cylinders having ports for admitting pressure fluid from said pilot fluid source for shifting the spindle, said spindle having reduced portions disposed so as to connect said primary outlet ports respectively to said primary inlet port and one of said exhaust ports in one shifted position of the spindle and to reverse such connections in another shifted position of the spindle, and said spindle having other reduced portions disposed so as to connect one of said cylinders to one of said pilot outlet ports in said one shifted position of the spindle and to connect the other of said cylinders with the other pilot outlet port in the other shifted position of the spindle.

4. In a hydraulic system, is combination, a hydraulic ram, a source of primary pressure fluid, a source of pilot pressure fluid, a directional control valve for said ram comprising a valve body having an inlet port connected to said primary pressure source, a pair of exhaust ports, and a pair of outlet ports connected to said ram, a spindle slidable through said valve body, pilot pressure fluid operated means at opposite ends of said body operable selectively to shift said spindle in opposite directions to two extreme positions, said spindle having reduced portions disposed so as to connect said outlet ports respectively to said inlet port and one of said exhaust ports in one extreme position of the spindle and to reverse such connections in the other extreme position of the spindle, adjustable stop means carried by said valve body, and means operable by the pressure of the fluid at one of said outlet ports and cooperating with said stop means for limiting the movement of said spindle toward one extreme position until the pressure at said port has fallen to a predetermined value.

5. A hydraulic system as defined in claim 4 in which the pressure responsive means permits movement of the spindle to a position to establish restricted communication between said one outlet port and one of said exhaust ports so as to bleed off fluid gradually until the pressure at that port falls to said predetermined value.

6. A directional control valve comprising, in combination, a valve body having a longitudinal bore, cylinders mounted at opposite ends of said body in alinement with said bore, a spindle slidable in said bore and having its opposite ends projecting into said cylinders, means biasing said spindle to a neutral position, said cylinders having ports for the admission of pressure fluid alternately whereby said spindle may be shifted in opposite directions from the neutral position to either of two operated positions, said valve body having a series of ports opening from said bore including a primary pressure inlet port, a pair of exhaust ports, a pair of primary pressure outlet ports, and a pair of pilot pressure outlet ports, said spindle being operative when in neutral position to block all of said ports and having reduced portions located so as to be effective in one operated position of the spindle to connect said primary outlet ports respectively to said primary inlet port and one of said exhaust ports, and to reverse such connections when shifted to the other operated position, said spindle having other reduced portions located so as to be effective to establish communication between the cylinder receiving pilot pressure fluid to shift the spindle to operated position and one of said pilot pressure outlet ports.

7. In a control valve, in combination, a valve body having a bore, means defining cylinders at opposite ends of said bore, a spindle slidable in said bore and projecting at opposite ends into said cylinders, each of said cylinders having a port for the admission of pressure fluid to shift the spindle, said valve body having a series of primary pressure fluid inlet and outlet ports and a pilot outlet port opening from said bore and controlled by said spindle and said spindle having a reduced portion operative upon shifting of the plunger to one extreme position for establishing communication between one of said cylinders and said pilot outlet port, and means responsive to the pressure prevailing at one of said primary outlet ports for blocking movement of said spindle to said one extreme position.

8. A control valve comprising, in combination, a body having a bore with a spindle slidable therein, said body having a series of ports opening from said bore including a pressure fluid inlet port, a pair of exhaust ports and a pair of outlet ports, means biasing said spindle to a neutral position effective to block all of said ports, means operable to shift said spindle in opposite directions from said neutral position to either of two operated positions, said spindle having reduced portions disposed so as to connect said outlet ports with said inlet port and one of said exhaust ports respectively in one operated position and to reverse such connections in the other operated position, and means operable when the pressure of the fluid at one of said outlet ports exceeds a predetermined value for limiting movement of said valve spindle toward the operated position in which that outlet port is connected to the exhaust port.

9. A control valve comprising, in combination, a body having a bore with a spindle slidable therein, said body having a series of ports opening from said bore including a pressure fluid inlet port, a pair of exhaust ports and a pair of outlet ports, means biasing said spindle to a neutral position effective to block all of said ports, means operable to shift said spindle in opposite directions from said neutral position to either of two operated positions, said spindle having reduced portions disposed so as to connect said outlet ports with said inlet port and one of said exhaust ports respectively in one operated position and to reverse such connections in the other operated position, means defining a chamber at one end of said spindle, a plunger shiftable by pressure fluid in said chamber to a position to limit movement of said spindle toward one of said operated positions, and a pressure fluid supply passage in said spindle connecting said chamber with one of said outlet ports.

10. A control valve comprising, in combination, a body having a bore with a spindle slidable therein, said body having a series of ports opening from said bore including a pressure fluid inlet port, a pair of exhaust ports and a pair of outlet ports, means biasing said spindle to a neutral position in which it is effective to block all of said ports, means operable to shift said spindle in opposite directions from said neutral position to either of two extreme positions, said spindle having reduced portions disposed so as to connect said outlet ports with said inlet port and one of said exhaust ports respectively in one extreme position and to reverse such connections in the other extreme position, adjustable stop means carried by the valve body, and a plunger engageable with said stop means effective when the pressure of the fluid at one of said outlet ports exceeds a predetermined value to limit the movement of said spindle toward the extreme position in which said one outlet port is connected to the exhaust port.

References Cited in the file of this patent

UNITED STATES PATENTS

| | | |
|---|---|---|
| 1,096,106 | Henry | May 12, 1914 |
| 1,829,655 | Huguemin | Oct. 27, 1931 |
| 2,057,088 | De Miller | Oct. 13, 1936 |
| 2,319,551 | Linden | May 18, 1943 |
| 2,577,981 | Stacy | Dec. 11, 1951 |
| 2,590,137 | Towler | Mar. 25, 1952 |